(12) United States Patent
Kasapi et al.

(10) Patent No.: US 6,999,771 B1
(45) Date of Patent: Feb. 14, 2006

(54) CHANNEL ASSIGNMENTS IN A WIRELESS COMMUNICATION SYSTEM HAVING SPATIAL CHANNELS INCLUDING GROUPING EXISTING SUBSCRIBERS IN ANTICIPATION OF A NEW SUBSCRIBER

(75) Inventors: Athanasios Agamemnon Kasapi, San Francisco, CA (US); Peter George Khoury, San Francisco, CA (US); Anne-Flore Roger, San Francisco, CA (US)

(73) Assignee: ArrayComm LLC, San Jose, CA (US)

( * ) Notice: Subject to any disclaimer, the term of this patent is extended or adjusted under 35 U.S.C. 154(b) by 672 days.

(21) Appl. No.: 09/968,356

(22) Filed: Sep. 28, 2001

(51) Int. Cl.
*H04Q 7/20* (2006.01)

(52) U.S. Cl. .................. 455/450; 455/453; 455/509; 455/516

(58) Field of Classification Search ............. 455/63.1, 455/166.2, 179.1, 185.1, 450, 451, 442, 447, 455/509, 516, 452.1, 452.2, 453, 455, 464, 455/511, 515, 434; 370/322, 329, 341, 348
See application file for complete search history.

(56) References Cited

U.S. PATENT DOCUMENTS

| 5,809,423 | A | * | 9/1998 | Benveniste | 455/452.2 |
| 5,886,988 | A | * | 3/1999 | Yun et al. | 455/509 |
| 6,295,453 | B1 | * | 9/2001 | Desgagne et al. | 455/448 |
| 6,490,452 | B1 | * | 12/2002 | Boscovic et al. | 455/436 |
| 6,577,848 | B1 | * | 6/2003 | Gregg et al. | 455/13.2 |
| 6,594,245 | B1 | * | 7/2003 | Rimhagen et al. | 370/337 |
| 6,728,544 | B1 | * | 4/2004 | Boyer et al. | 455/450 |
| 6,778,513 | B1 | * | 8/2004 | Kasapi et al. | 370/330 |

FOREIGN PATENT DOCUMENTS

WO        WO 99/60809        11/1999

\* cited by examiner

*Primary Examiner*—Sonny Trinh
(74) *Attorney, Agent, or Firm*—Blakely Sokoloff; Taylor & Zafman LLP (57) ABSTRACT

Methods and systems are provided for assigning channels in a spatial division multiple access communication network. The network includes a plurality of conventional channels some of which are configurable to be shared concurrently by plural subscribers. The method includes determining combinations of subscribers from the existing subscribers. Existing subscribers are reassigned to share channels thereby freeing resources for new subscribers.

32 Claims, 3 Drawing Sheets

CHANNEL ASSIGNMENTS IN A WIRELESS COMMUNICATION SYSTEM HAVING SPATIAL CHANNELS INCLUDING GROUPING EXISTING SUBSCRIBERS IN ANTICIPATION OF A NEW SUBSCRIBER

The present invention relates generally to wireless communication systems.

BACKGROUND OF THE INVENTION

Wireless communication systems are generally allocated a portion of the radio frequency (RF) spectrum for their operation. The allocated portion of the spectrum is divided into communication channels and channels are distinguished by frequency, time or code assignments, or by some combination of these assignments. Each of these communication channels will be referred to as conventional channels, and a conventional channel typically corresponds to a full-duplex channel unless otherwise noted. The establishment of a communication link in a communication system depends not only on the availability of a conventional channel but also on the quality of communication that will result from the use of a given available conventional channel.

In wireless communication systems, a conventional channel is used for communication between a base station (sometimes referred to as cell station) and a subscriber station (sometimes referred to as a personal station). A cell station provides coverage to a geographic area referred to as a cell and may be a point-of presence providing a connection between the subscriber station and a wide area network such as a Public Switched Telephone Network (PSTN). The underlying motivation for the use of cells in wireless systems is the ability to reuse a particular portion of the RF spectrum available in geographically different areas. The reuse of the frequency spectrum can introduce co-channel (intercell) interference between users in different cells that share a common conventional channel. If co-channel interference is not carefully controlled, it can severely degrade the quality of communications. System capacity is in general limited by interference because of the reduction in number of reusable channels of acceptable quality.

Each cell is organized about a cell station. The cell station includes multiplexing equipment for accepting incoming telephone landlines (i.e., voice or data lines) and multiplexing the incoming voice/data signals onto a radio frequency (RF) carrier that is broadcast by an antenna system over a region that the cell is designated to cover. Individual subscriber stations (e.g., handsets and the like) are each equipped to receive the broadcast modulated carrier and to demultiplex a specifically assigned channel of the carrier that carries the voice/data that is intended for a given receiver.

In a conventional wireless communication system, an assigned RF bandwidth of frequencies is simultaneously shared by multiple subscribers. Three techniques for sharing bandwidth are frequency division multiple access (FDMA), time division multiple access (TDMA) and code division multiple access (CDMA). In FDMA systems, the available bandwidth is sub-divided into a number of sub-bands. Each sub-band accommodates a carrier that is modulated by a subscriber's data. In TDMA systems, time-sharing is used to multiplex multiple subscribers. Each subscriber is allocated a periodic time-slot for transmission of data. In CDMA systems, multiple subscribers are accommodated on a single carrier (or sub-carrier) and each subscriber is assigned a code waveform that is used to modulate the carrier for each bit of data being transmitted. Each subscriber has an assigned coded waveform taken from a set of orthogonal waveforms, thus allowing the system to separate (demodulate) the individual subscriber transmissions.

Cellular communication systems may also use spatial division multiple access (SDMA) techniques for providing increased subscriber system capacity in systems that use FDMA, TDMA, and/or CDMA methods without any increase in the allocated RF bandwidth. SDMA techniques are discussed in greater detail in U.S. Pat. No. 5,515,378, to Roy III, et. al., entitled "Spatial Division Multiple Access Wireless Communication Systems." SDMA exploits the spatial distribution of subscribers in order to increase the usable system capacity. Because subscribers tend to be distributed over a cell area, each subscriber-cell station pair will tend to have a unique spatial signature characterizing how the cell station antenna array receives signals from the subscriber station, and a second spatial signature characterizing how the cell station antenna array transmits signals to the subscriber station. Subscribers sharing the same conventional channel on a unique basestation are said to be using different spatial channels. The necessary data (referred to as the spatial signature of a subscriber) for implementing SDMA is obtained empirically from the transmissions received by the cell station from each active subscriber. Where spatial signatures are used, the effective radiation patterns of the antenna array can allow more than one subscriber to use a given packet time-slot, code or frequency. For example, if the effective radiation pattern of a first subscriber results in a relatively low energy "null" in the vicinity of a second subscriber sharing a packet time allocation, and the second subscriber's spatial signature results in a null in the vicinity of the first subscriber, the simultaneous RF packet transmissions will not cause interference upon reception at the two subscriber stations. Also, transmissions from the two subscribers to the cell station will be separable at the cell station.

A conventional wireless communication system includes a finite number of channels on which signals are transmitted. The number of channels depends on many system factors. By sharing a channel among subscribers, as discussed above with respect to SDMA techniques, more subscribers can be accommodated.

A particular example of an existing protocol for establishing a connection in a cellular communication system between a subscriber station and the cell station is described in "Personal Handy Phone System" which is part of the Association of Radio Industries and Businesses (ARIB) Preliminary Standard, Version 2, RCR STD-28, approved by the Standard Assembly Meeting of December, 1995.

In accordance with the PHPS standard, a control sequence is used to set-up and establish an incoming call to a subscriber station (i.e., a personal station or PS). The sequence includes: (1) the CS paging on a paging channel (PCH) of the selected PS to which an incoming connection is desired; (2) the selected PS responding on the signaling control channel (SCCH) by sending a link channel establishment request; (3) the CS responding to the PS request by selecting a traffic channel (TCH) and sending the selected TCH as a link channel (LCH) assignment to the PS on the SCCH; (4) the selected PS switching to the assigned LCH and transmitting a sequence of synchronization (SYNC) burst signals followed by a sequence of idle traffic bursts; and (5) upon successful detection of a synchronization signal, the CS responds by transmitting a sequence of SYNC bursts on the LCH followed by a sequence of idle traffic bursts and then proceeding to establish a connection with the incoming call to the CS, invoking any additional optional signaling that may be required (e.g. encryption and user authentication).

The control sequence for establishing an uplink connection initiated by a PS desiring to connect to the CS includes: (1) the PS sending a link channel establishment request on the signaling control channel (SCCH); (2) the CS responding to the PS request by selecting a traffic channel (TCH) and sending the selected TCH as a link channel (LCH) assignment to the PS on the SCCH; (3) the PS switching to the assigned LCH and transmitting a sequence of synchronization (SYNC) burst signals followed by a sequence of idle traffic bursts; and (4) upon successful detection of the synchronization signal, the CS responds by transmitting a sequence of SYNC bursts on the LCH followed by a sequence of idle traffic bursts and then proceeding to establish a connection with the incoming call to the CS, and invoking any additional optional protocols that may be required (e.g. encryption and user authentication).

In systems that use SDMA techniques, the control sequences described above can be modified depending on the number of subscribers being serviced and the number of channels available. For example, if a connection is sought to add a subscriber when there are no available channels (i.e., all available channels are assigned to subscribers), the sequence may be augmented to include a channel sharing selection process. One example of a channel sharing selection process is described in the commonly owned U.S. Pat. No. 5,886,988, entitled "CHANNEL ASSIGNMENT AND CALL ADMISSION CONTROL FOR SPATIAL DIVISION MULTIPLE ACCESS COMMUNICATION SYSTEMS," the contents of which are expressly incorporated herein by reference. When a new subscriber is added, a sharing decision is made as to which current subscriber is the best match for pairing with the new subscriber. The sequence includes an assignment of the new subscriber to the channel occupied by the selected current subscriber, forming a best match.

While spatial channels can be used to increase the traffic managed per cell station, the use of spatial channels also increases the risk of call quality degradation and even call drop. Conventional systems assign new users or existing users locations for transmission consisting of a time slot and a frequency. Every transmission location has a risk of interference associated with it. Conventional systems manage these risks by monitoring various combinations of time slots and frequency to evaluate which location poses the least risk of interference to both the basestation and the phone. If the basestation incorrectly evaluates risk it might assign a call to a location that has a high level of interference causing performance problems or call drop. Basestations currently move calls around to different locations but only when the call quality starts to suffer.

When SDMA techniques are used, making a best pairing decision becomes paramount to performance. If not careful, a new subscriber may be assigned to a cell station and a channel on which poor quality is experienced due to excessive interference from the signal transmitted to a co-user. Moreover, the addition of a new subscriber has the potential consequence of adversely affecting the quality of communications on existing connections. Existing subscribers can suffer from increased channel interference from the addition of a new subscriber, or other unrelated causes, that can require moving subscribers from currently assigned channels to new channels in order to restore acceptable quality communications.

As described above, the spatial signature data collected for implementing SDMA and making the pairing decisions is obtained empirically from the transmissions received by the cell station from each active subscriber, including the new subscriber. However, the transmissions from the new subscriber necessarily are limited in nature (i.e., the new subscriber has been connected to the CS for only a small amount of time) and, as such, selections based on this limited amount of data may be less than optimal. The transmission characteristics of existing subscribers tend to be easier to quantify due to the length of time the connections have been set up. Further, some calls may be so short lived that the pairing of a new subscriber with the short call subscriber may be not desirable.

SUMMARY OF THE INVENTION

In one aspect, the invention provides a method for assigning channels in a spatial division multiple access communication network. The network includes a plurality of conventional channels some of which are configurable to be shared concurrently by plural subscribers. The method includes determining if a new subscriber is to be added to the network, determining if a conventional channel is available, and if so, assigning the new subscriber to the available channel. If no conventional channel is available, the method includes determining an acceptable combination of subscribers from the existing subscribers and not including the new subscriber to share a channel. The existing subscribers are reassigned to share the channel creating a spatial channel thereby freeing at least one conventional channel. The new subscriber is assigned to the free conventional channel.

Aspects of the invention can include one or more of the following features. The method can include periodically evaluating each spatial channel including determining if each combination is an acceptable combination, and, if not, then reassigning the existing subscribers to achieve acceptable combinations. The step of determining if each combination is acceptable can include evaluating with hysteresis each combination such that the step of reassigning the existing subscribers only is executed when: a new combination is substantially better than an existing combination; and, a new combination is recommended, and wherein a new combination is recommended only where the new combination is a predetermined amount better than an existing combination.

The step of determining an acceptable combination can include retrieving an n-dimensional structure of recommendations, each entry in the n-dimensional structure including a rating for a combination of n existing subscribers, and evaluating each n-dimensional structure entry and selecting a combination that is optimal. The step of determining an acceptable combination can include retrieving a matrix of recommendations, each entry in the matrix including a rating for a pairing of existing subscribers, and evaluating each matrix entry and selecting a pairing that is optimal.

The method can include evaluating combinations of subscribers periodically and rating each combination for compatibility based on one or more factors, storing the rating for each pair in an n-dimensional structure of ratings, and wherein the step of determining an acceptable combination can include evaluating the n-dimensional structure of ratings to identify an optimal combination of n existing subscribers. The step of providing an n-dimensional structure can include calculating for each combination a rating as a function of one or more predetermined factors. The factors can be selected from the group consisting of subscriber speed, dynamic range, correlation, received signal strength indicator, frame error rate, alignment and monitored time.

The rating can be a value that indicates whether a combination is acceptable or unacceptable or desirable. The value can be selected from n-possible values ranging from acceptable to unacceptable. An acceptable rating can be further subdivided into a plurality of gradations, each corresponding to a combination of factors that is less than desirable, but still acceptable for combining the respective subscribers, where a number of gradations is a predetermined number.

Each factor can have a desirable threshold, and wherein a combination is assigned a desirable rating if a measured value for a factor associated with either the combination or an individual subscriber of the combination for any, all or a predetermined number of the factors exceeds a desirable threshold. Each factor can have a minimal threshold, and wherein a combination is assigned an unacceptable rating if a measured value for a factor associated with either the combination or an individual subscriber of the combination for at least one, all or a predetermined number of the factors is less than a minimal threshold. Each factor can have an acceptable threshold, and wherein a combination is assigned an acceptable rating if a measured value for a factor associated with either the combination or an individual subscriber of the combination for any, all or a predetermined number of the factors exceeds an acceptable threshold. A factor can be an amount of time that a subscriber has been monitored, and wherein a combination is assigned an unacceptable rating if an amount of time that any individual subscriber of the combination has been monitored is less than a minimal time threshold. The minimal time threshold can be approximately two seconds. Each of the predetermined factors can be weighted, and the rating can be a function of the one or more weighted predetermined factors.

The step of determining an acceptable combination of subscribers from the existing subscribers can include determining if no combination of existing subscribers is acceptable. If no combination of existing subscribers is acceptable then the method can include determining if a combination of one or more existing subscribers and the new subscriber is acceptable, and if so, combining the new subscriber with one or more existing subscribers to make a best combination. The step of combining the new subscriber with one or more existing subscribers can include not making a combination if a rating associated with the combination is less than a preset threshold and dropping the new subscriber.

In another aspect, the invention provides a method for assigning channels in a spatial division multiple access communication network. The network includes a plurality of conventional channels some of which are configurable to be shared concurrently by plural subscribers. The method includes determining if a new subscriber is to be added to the network, determining if a predetermined number of conventional channels are available, and if so, assigning the new subscriber to one of the available channels. If the predetermined number of conventional channels is not available, the method includes determining one or more acceptable combinations of subscribers from the existing subscribers and not including the new subscriber to share a channel. The method includes reassigning the existing subscribers in each combination to share a channel creating one or more spatial channels thereby freeing at least one conventional channel and assigning the new subscriber to the free conventional channel.

In another aspect, the invention provides a method for assigning channels in a spatial division multiple access communication network. The method includes determining if a predetermined number of conventional channels are available, and if the predetermined number of conventional channels is not available, determining one or more acceptable combinations of subscribers from the existing subscribers. The method includes reassigning the existing subscribers in each combination to share a channel creating one or more spatial channels thereby freeing at least one conventional channel for a future subscriber. The predetermined number can be one.

In another aspect, and in a communication system that provides a plurality of conventional channels, some of which may be shared concurrently by at least two subscribers, the invention provides a method for preparing the communication system for a new subscriber. The method includes evaluating combinations of existing subscribers including rating each combination and storing the rating information such that when a new subscriber initiates access to the communication system, two or more existing subscribers will be directed to share a conventional channel in accordance with the rating information to free a slot for the new subscriber.

Aspects of the invention can include one or more of the following features. The method includes reassigning existing subscribers based on the rating information prior to the initiation by the new subscriber. The reassigning step can include reassigning one or more existing subscribers including freeing a conventional channel for use by a prospective new subscriber.

Aspects of the invention can include one or more of the following advantages. A system is provided that continuously monitors existing subscriber communication channels, evaluating grouping opportunities, and when required to make grouping decisions to support new subscribers, determines a best matching group of subscribers from all of the existing subscribers including the new subscriber. The system also continuously monitors existing subscriber communication channels for grouping or separation (decoupling) opportunities. The system performs analysis in the background at regular intervals and stores group rating data in a data structure (e.g., matrix) that can easily be retrieved at a time when grouping decisions are required to be made. A system is provided to evaluate and manage risk in a wireless communication system. Risk management includes the evaluation of one or more risk criteria including evaluating factors associated with interference and each caller. The factors can be selected from spatial signature, signal strength, and other quantities.

These and other advantages will be readily apparent to those of ordinary skill in the art from the description below, the figures and the claims.

DETAILED DESCRIPTION OF THE INVENTION

Figure 1:
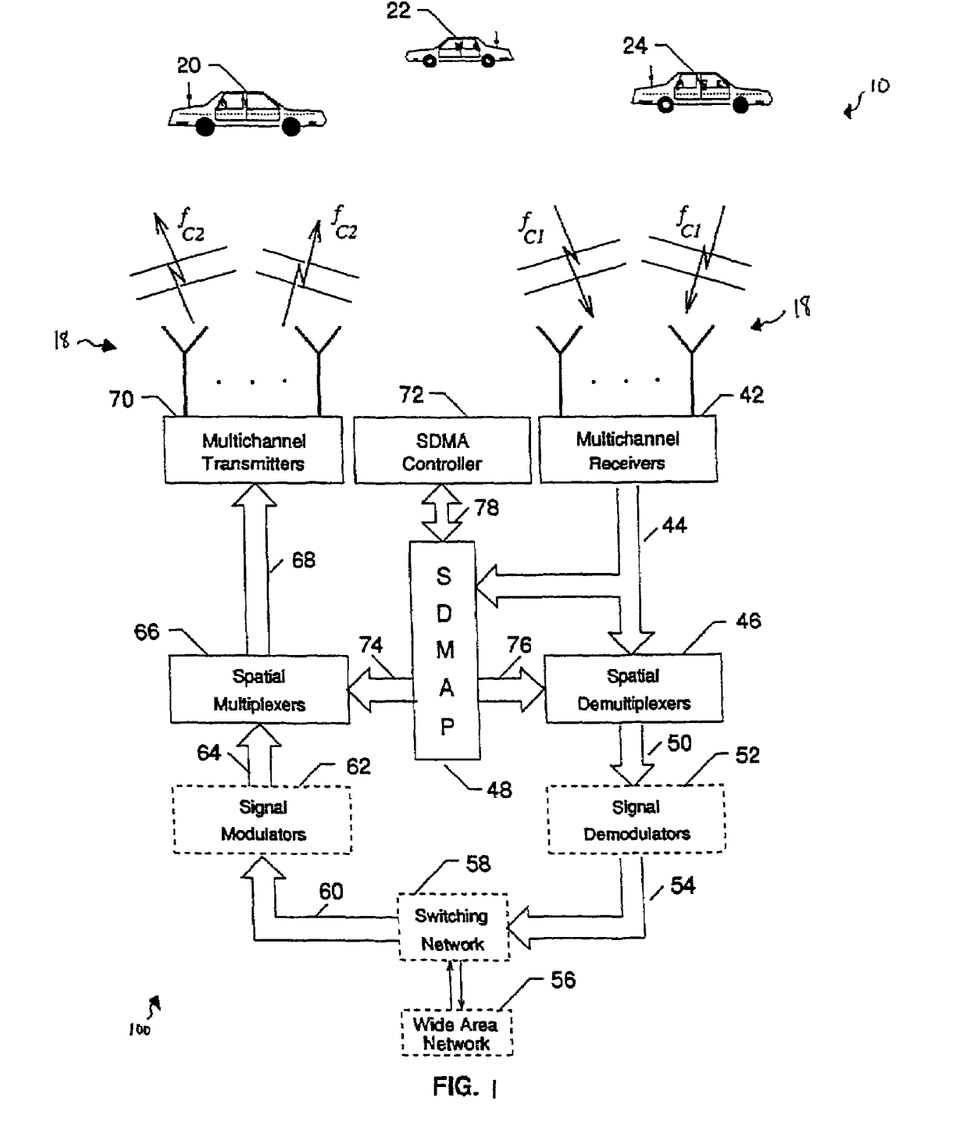
FIG. 1 shows a wireless SDMA TD/FD/CDMA system.

FIG. 1 shows a wireless SDMA TD/FD/CDMA system (wireless system 10) in which a number of subscriber stations (symbolically shown as handsets) 20, 22, 24 are being served by cell station 100 that may be connected to a wide area network (WAN) 56 for providing any required data services and connections external to the immediate wireless system 10. Switching network 58 interfaces with WAN 56 for providing multi-channel duplex operation with the WAN by switching incoming WAN data to lines 60 of cell station 100 and switching outgoing signals from cell station 100, on line 54 to the WAN. Incoming lines 60 are applied to signal modulators 62 that produce modulated signals 64 for each subscriber station 20–24 in communication with cell station 100. A set of spatial multiplexing weights 74 for each subscriber station 20–24 are applied to the respective modulated signals in spatial multiplexers 66 to produce spatially multiplexed signals 68 to be transmitted by a bank of multi-channel transmitters 70 using transmit antenna array 18. The SDMA processor (SDMAP) 48 produces and maintains spatial signatures for each subscriber station for each conventional channel, calculates spatial multiplexing and demultiplexing weights for use by spatial multiplexers 66 and spatial demultiplexers 46, and uses the received signal measurements 44 along with other data to select a channel for a new connection. A process for selecting a channel for a new connection is described in greater detail below. Accordingly, the signals from the current active subscriber stations, some of which may be active on the same conventional channel, are separated and interference and noise suppressed. When communicating from the cell station to the subscriber stations, an optimized multi-lobe antenna radiation pattern tailored to the current active subscriber station connections and interference situation is created.

Spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the cell station 100. The outputs of spatial demultiplexers 46 are spatially separated signals 50 for each subscriber station 20–24 communicating with the cell station 100, which are applied to signal demodulators 52 to produce demodulated received signals 54. In one implementation, the demultiplexing and demodulation processing are performed together in a nonlinear multidimensional signal processing unit.

The demodulated received signals 54 are then available to switching network 58 and WAN 56. In an FDMA system implementation, each multi-channel receiver and each multi-channel transmitter is capable of handling multiple frequency channels. In other implementations, multi-channel receivers 42 and multi-channel transmitters 70 may instead handle multiple time slots, as in a TDMA system; multiple codes, as in a CDMA system, or some combination of these well known multiple access techniques. Because of the interference introduced by frequency reuse and the fragile nature of orthogonality for conventional and spatial channels, the wireless SDMA system 10 includes a method for cell station and channel assignment that minimizes these adverse effects when a new call or connection between a cell station and a subscriber is made. The labels new subscriber and new connection will be used interchangeably to denote a new call or connection between a cell station and a subscriber station, and the labels active subscriber, existing connection and existing subscriber will be used interchangeably to denote a call or connection in-progress between a cell station and a subscriber station.

Channel assignment in a full-duplex communication channel includes the selection of both an uplink channel (from subscriber to cell station) and a downlink channel (from cell station to subscriber). The case of half-duplex channel assignment may be considered as a special case of the full-duplex case. Interference on the uplink channel comes primarily from other subscriber stations while interference on the downlink channel is caused primarily by other cell stations. Consequently, the quality of communications on the uplink and downlink channels will generally differ. In one implementation of the invention, uplink and downlink channel assignments are performed independently and separately. However, many practical systems impose a fixed relationship between the uplink and downlink channels so that independent selection is not possible. For example, in the Personal Handyphone System (PHS) standard, the uplink and downlink channels form a full-duplex channel and must be on the same RF carrier, so that the carrier frequency of the uplink and downlink channel cannot be independently specified. Also, the downlink time division multiplexed time-slot is specified as preceding the uplink time-slot by exactly four time-slots. For such systems, the selection of either uplink or downlink channel automatically determines the selection of the other. Systems and considerations for selecting channels are described in "CHANNEL ASSIGNMENT AND CALL ADMISSION CONTROL FOR SPATIAL DIVISION MULTIPLE ACCESS COMMUNICATION SYSTEMS."

As previously explained, in SDMA there are two or more spatial signatures associated with each subscriber-base station pair on a particular conventional channel. Cell station 100 associates with each subscriber station a receive, or uplink, spatial signature related to how that subscriber station receives signals transmitted to it by the base station's antenna array and a transmit, or downlink, spatial signature related to how the base station's receive antenna array receives signals transmitted by the subscriber station. The transmit and receive spatial signatures contain information about the amplitude attenuation and relative phase of the RF signal at each antenna element transmitter and receiver, respectively, of the cell station. This amplitude and phase information at each receiver or transmitter can be treated as vector elements of a complex column vector and be stored in a database and updated at prescribed intervals. The spatial signatures may be estimated during the initial phase of a call setup when a new connection from a subscriber is initiated, or they may be analytically determined. For example, a link channel establishment phase can be initiated on the signaling control channel (SCCH) before communicating on an assigned link (traffic) channel (LCH). During this link channel establishment phase, the spatial signatures of the new subscriber can be measured.

Several optional approaches to uplink channel assignment are available, each varying in relative complexity and performance characteristics: a Weighted Correlation method, a Predicted Quality method, and a Hierarchical method combining both the Weighted Correlation method and the Predicted Quality method. Each of these methods is discussed in "CHANNEL ASSIGNMENT AND CALL ADMISSION CONTROL FOR SPATIAL DIVISION MULTIPLE ACCESS COMMUNICATION SYSTEMS."

In one implementation, a subscriber's call is assigned to a conventional channel with an acceptable cost. Cost functions are described in greater detail in "CHANNEL ASSIGNMENT AND CALL ADMISSION CONTROL FOR SPATIAL DIVISION MULTIPLE ACCESS COMMUNICATION SYSTEMS." The cost functions are used to compare pairings between subscribers.

In one implementation, a pairing matrix (spatial matrix) is used to store the results of the pairing analysis for each potential pair of subscribers. Each entry in the matrix corresponds to a recommendation for a given pairing of subscribers. The spatial matrix can be updated in the background using received signal data 44 (FIG. 1) and call quality reports generated by SDMAP 48. In one implementation, the spatial matrix reflects a recommendation for pairing based on an analysis of one or more of the following characteristics associated with the subscribers to a pair: speed, dynamic range, correlation, frame error rate (FER), received signal strength indicator (RSSI), alignment and longevity (time). In the preferred implementation, the recommendation indicates a pairing of existing subscribers that is optimal. Based on the recommended pairing, an existing subscriber is moved and paired with another existing subscriber, while the new subscriber is assigned to the now free conventional channel. The process for assigning channels and monitoring channels for pairing and separation opportunities is described in greater detail below. While the system below will be described in terms of pairs of callers, other groupings of two or more callers may be made by the system. In these implementations, the spatial matrix can include entries for each potential grouping.

Call Monitoring

Each call (subscriber) is monitored and call processing is performed to provide regular updates to the spatial matrix. In one implementation, plural buffers are used to store and process data. In one implementation, subscriber data is received at a first buffer until full, then written to a second buffer. The first buffer is processed while the second buffer is filling so that statistical data can be gathered contemporaneously with the collection of new data. The process is reversed when the second buffer becomes full.

In one implementation, histograms are used to store data collected for a given characteristic. The histograms can include plural bins and can be used to collect data over a fixed length period of time. At the end of a time period, the data can be analyzed and used in computing a recommendation as is described in greater detail below. Alternatively, instead of using fixed length time windows for monitoring caller data, exponentially weighted histograms can be used. At every iteration, entries in a given histogram associated with a given parameter (i.e., characteristic, such as speed factor) can be multiplied by a fixed fraction ("the weighting"). Thereafter, any newly received data can be added to the histogram. Exponential weighting can be faster and more stable to implement. Histograms and data collection methods for use in making recommendations for combinations of existing subscribers are discussed in greater detail below.

Speed Factor

The spatial signature for a user on a spatial channel ideally should be stable. Accordingly, highly mobile subscribers are not ideal candidates for groupings. In one implementation, the relative speed of a subscriber is calculated using the dot product of the spatial signature of each pair of consecutive, error free bursts received by the cell station. Each value can in turn be entered into a plural (e.g., 4) bin histogram. In one implementation, the dot products are normalized and filtered such that only the 0.5, 2.0, 8.0 and 25.0 percentiles of each time interval are stored in the histogram. A speed factor for each subscriber is then defined based on the number of entries in the respective bins of the histogram. A speed threshold may be set, and compared to the speed factor. If the speed factor exceeds the threshold, then the individual subscriber is a poor candidate for grouping. In one implementation, each candidate to a pair is evaluated (si & sj), the results of which are combined to produce a resultant speed factor for the pairing $sr = f(s_1, s_j)$. The resultant speed factor can be used in the calculation of the recommendation for the pairing that is stored in the spatial matrix.

Dynamic Range Factor

Two signals on a spatial channel call ideally must stay within a certain range from each other for the algorithms proposed to maintain efficiency. Dynamic range is measured by the difference between the signal levels of the received signals associated with the subscribers. In one implementation, a received signal strength indicator (RSSI) difference can be calculated between two candidate subscribers at each good burst. The results can be stored in a plural bin (e.g. 4) histogram. At an appropriate time, the results can be evaluated and a dynamic range factor (DynRange$_{i,j}$) for the pairing assigned based on the entries in the histogram bins. A threshold can be defined at which a pairing is deemed unacceptable. The use of thresholds is discussed in greater detail below in calculating recommendations to be included in the spatial matrix.

In one implementation, approximately a 15 dB threshold for separation between the subscribers is used. In one implementation, four histogram bins are used each with ranges that spanned from 0 to the threshold value over small dynamic ranges (e.g., 5 dB dynamic range where bin 1 (0–5 dB), bin 2 (5–10 dB), bin 3 (10–15 dB) and bin 4 (greater than 15 dB)). In this way, pairs of candidate that have differences that are greater than the threshold can be discarded immediately, while changes in the threshold may be able to be realized without changing the bin assignments (e.g., a threshold of 10 dB could be realized by evaluating the contents of bins 1 and 2 and disregarding the contents of bins 3 and 4).

User Correlation Factor

In one implementation, correlation data describing the degree of difference between spatial signatures of a proposed grouping (e.g., pair) are evaluated. The correlation between the spatial signatures can be computed on each time interval and accumulated in a plural bin histogram. Again, the bins can be assigned ranges of correlation that correspond to small ranges between little or no correlation (i.e., decorrelated subscribers) and an unacceptable level of correlation (e.g., a correlation threshold). In one implementation, the correlation factor (correlations) is computed as a correlation coefficient that is equal to the absolute value of the dot product of the normalized source spatial signatures of a burst from one subscriber and another.

Frame Error Rate Factor

Frame error rate (FER) information for a subscriber can be reported to the SDMAP 48 (FIG. 1) at preset intervals. In one implementation, the FER information is reported every 100 ms. In one implementation, a filtered FER value is stored for each call. The FER can be averaged over a time interval, then a running filtered value can be computed. The running filtered value can be used to discard as non-optimal calls that have an unacceptably high FER as candidates for grouping. In one implementation, the filtered FER value is compared to a threshold and a resultant FER factor (FER$_i$ and FER$_j$) is determined for each subscriber. Alternatively, the FER factor can be derived from an analysis of histogram data associated with the filtered FER value data collected for a given subscriber.

Alignment Factor

As described above, in order to successfully share a channel, the spatial receivers must be able to differentiate between signals sent by the respective paired subscribers. In one implementation, an alignment factor (Align$_{i,j}$) is determined for each pairing. Alignment (or lack thereof) is a measure of the systems ability to differentiate two users by looking for the user's respective unique words. If the alignment factor is high or set, then one user's unique word can be identified during one window while the other user's unique word can be identified during another window that is sufficiently (e.g., significantly) shifted from the first. In one implementation, the difference is a predetermined large number that allows the system to differentiate one user from another. In another implementation in which the system is oversampled, the alignment of both users must fall on the same sample thus allowing for faster simultaneous processing of both users.

Time Factor

In one implementation, a minimum time threshold for a call is established. A timer measures call duration, and after the threshold has been exceeded, the call (i.e., subscriber) becomes a candidate for grouping. In one implementation, two thresholds can be established, one less than the second. The first threshold can be set to a time interval that corresponds to a call duration in which the chance for success for a spatial channel is high. The second threshold can be set to a time interval that corresponds to a call duration in which the chance for success for a spatial channel is optimal. In one implementation, the time interval for the second threshold can be set to be approximately 2 seconds. Setting the time interval at approximately two seconds may result in all registration calls and most regular P-Mail messages being discarded as candidates for sharing. The setting of the time interval is a trade off. Some short duration calls are poor candidates for sharing (i.e., those calls for which the base station did not gather enough data to produce a good recommendation). However, some short duration calls are good candidates for sharing (e.g., location registration or Pmail) because these types of calls can support more quality degradation than a conventional voice call. For example, if a location registration call fails, the handset will try again, and the failure and re-registration will not have any consequences for the user. Accordingly, the setting of the thresholds will depend on various system factors.

A time factor ($t_{i,j}$) can be set for a prospective pairing using the comparison results from the call duration and the various thresholds. For example, if both calls have exceeded the optimal threshold, the time factor ($t_{i,j}$) can have the value of 1. If either call duration is less than a minimum time threshold, the time factor ($t_{i,j}$) can be set to a value of 0. Other time factor ($t_{i,j}$) values, between 0 and 1 can be set depending on the duration of the respective calls and their relationship to the time monitor thresholds.

Recommendation (Spatial Matrix Population)

Each entry in the spatial matrix is computed as a function of the one or more of the various factors described above. More specifically, in one implementation, for the combination of an ith and jth subscriber, a entry $M_{i,j}$ in the spatial matrix can be computed to be equal to a function of the speed factor for the ith and jth subscribers (si and sj, or $s_{i,j}$) the dynamic range factor (DynRange$_{i,j}$), the correlation factor (Correlation$_{i,j}$), the frame error rates (FERi & FERj) for the respective subscribers, the alignment factor (Align$_{i,j}$) and the monitor time (ti and tj, or $t_{i,j}$) (Recommendation$_{i,j}$= $M_{i,j}$=f($s_i$, $s_j$, DynRnage$_{i,j}$, Correlation$_{i,j}$, FER$_i$, FER$_j$, Align$_{i,j}$, and $t_{i,j}$). The function (f) can be a mathematical function or other construct for combining the individual factors. In one implementation, each factor is weighted, with the sum of the weights being a fixed number (e.g., 1).

In one implementation, the recommendation (i.e., rating) is an 8-bit value. The value of 0 is assigned to entries where the monitoring time $t_{i,j}$ is insufficient. The value of 1 can be assigned to entries that do not exceed a minimum threshold for every factor. A value of 255 can be assigned to entries that exceed a desirable threshold for every factor. Intermediate values can a be assigned based on compliance with one or more intermediate thresholds for each factor. For example, each factor may include three thresholds: the first threshold may be set at a level that reflects an desirable value, a second threshold may be set at a minimal value, a third intermediary threshold may be set an acceptable value. The recommendation value can then be set depending on the number of factors that exceed each threshold level. For example, an intermediate value of 128 can be assigned if all factors exceed their respective intermediary thresholds.

The recommendation can also be modified to include a best grouping or pairing. In some situations, no pairing or combination of existing subscribers will be desirable or even rise to the level of acceptable. Even so, pairings or combinations may be made (e.g., when the risk associated with the potential failed call is outweighed by the benefits to making the combination). In this example, thresholds for each factor may be reset to lower levels and the recommendation process can be repeated. Alternatively, the system may provide a best combination based on the empirical data (of the possible groupings) when no combinations are acceptable.

Figure 2:
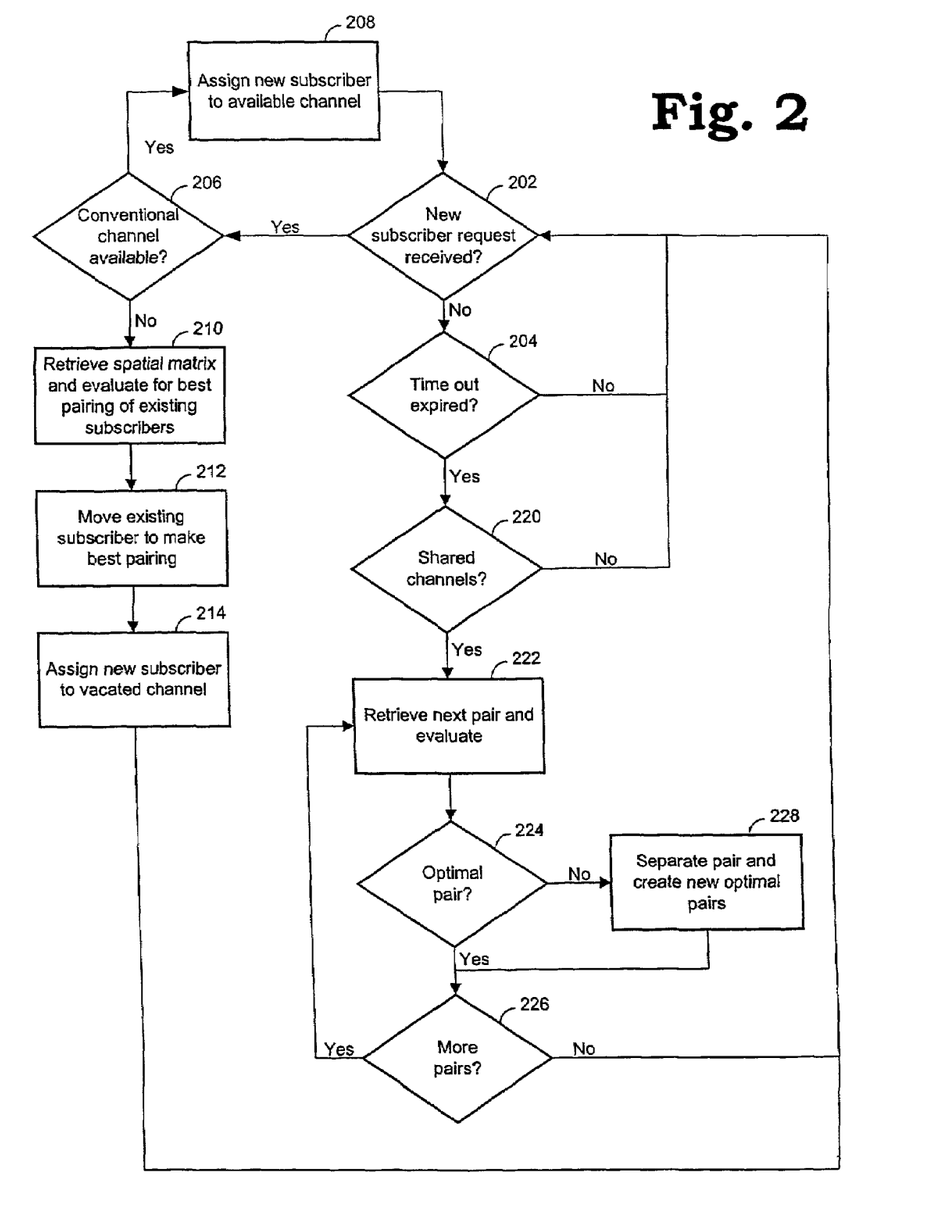
FIG. 2 is a flow diagram for a method for channel assignment.

Channel Assignment Referring now to FIG. 2, a method for assigning channels 200 is shown. The method can include spatial channels where two subscribers share a spatial channel. Those of ordinary skill in the art will recognize that other groupings (i.e., other than pairings) can be made. The method includes a check to determine if a request from a new subscriber has been received (202). If not, a check is made to determine if a timeout has expired, indicating that an optimal pairing analysis should be invoked (204). If the timeout has not expired, then the process continues at step 202.

If a request from a new subscriber has been received at step 202, then a check is made to determine if any conventional channels are available (206). If one is available, then the new subscriber is assigned to an available channel (208) and the process continues at step 202. If there are no available conventional channels at step 206, then the spatial matrix is retrieved and evaluated to determine a best pairing for existing subscribers (210). In one implementation, the best pairing is determined to be the pairing corresponding to the entry in the matrix having a greatest value. When the best pairing is determined, one of the subscribers of the best pairing is ordered to change channel assignments to the channel associated with the other of the best pairing (212). Concurrently, the new subscriber is assigned to the vacated conventional channel previously occupied by the transferred one of the subscribers of the best pairing (214). Thereafter the process continues at step 202.

If the timeout period in step 204 has expired (indicating that the time for pairing analysis has arrived), then a check is made to determine if one or more subscribers share a conventional channel (220). If no subscribers share a channel, then the timeout timer is reset and the process continues at step 202. If subscribers share a conventional channel, then a first/next pair of subscribers that share a conventional channel are evaluated (222). If the evaluation indicates that the pairing is the best available pairing (224), then the process continues by identifying (226) and evaluating (222) the next pair of subscribers that share a conventional channel. If no more pairs are identified, the timeout timer is reset and the process continues at step 202.

If the evaluation indicates that a better pairing is available in step 224, then the currently identified pairing is separated (i.e., the existing subscribers are reassigned to create a best pairing) and new assignments that can include new pairings are formed as appropriate (228). Thereafter the process continues at step 226. In one implementation, hysteresis is included in this process. Due to the risks associated with moving calls and the potential interferences and degradation that can result, continuous movement of calls is undesirable. To limit excess motion, the recommendation can include built in hysteresis. That is, the recommendation provided by the spatial matrix can be revised or processed in light of the level of improvement that can be achieved. For example, a recommendation to move a call can be made only when a potential pair is predetermined amount (e.g., significantly) better than a current pair.

In one implementation, the evaluation of a pair described above in step 222 includes the recognition of an available conventional channel. A conventional channel may become free as another call is terminated. Accordingly, the sharing process optimally may separate a shared channel and reassign a subscriber to a newly freed (i.e., vacated) conventional channel. Which channel to move can be determined based on call characteristics of the two subscribers. Conventionally, the worst call of the two subscribers is moved. The worst call can be determined by analysis of the degradation of the calls over time by looking at recently stored FER and RSSI information. If more than one channel is shared, then the pair that is least optimal is separated. The spatial matrix can be used to determine the least optimal pairing of the shared channels.

In one implementation, channel assignment may be augmented by the use of a predicted quality channel assignment method. The predicted channel quality assignment method predicts the quality of a communication that will result from assigning a new connection to a particular conventional channel. This is can be accomplished by estimating the signal power and the interference-plus-noise power that a subscriber will experience on each conventional channel if assigned to that channel by using a model of the RF environment and the SDMA processing, without actually assigning the call to any conventional channel. A method for predicting quality channel assignments is described in "CHANNEL ASSIGNMENT AND CALL ADMISSION CONTROL FOR SPATIAL DIVISION MULTIPLE ACCESS COMMUNICATION SYSTEMS."

In one implementation, the method above is changed to include the movement of calls to ensure that one or more channels are free for a new caller. In this implementation, a check is made to determine if a predetermined number of channels (e.g., 1) are available (i.e., have not been assigned to a call). If the predetermined number of channels is not available, then groupings (e.g., pairings) can be made using the information in the spatial matrix to free an appropriate amount of channels.

Call Preparation

Call processing includes providing specified performance at various points of time during the life of a call. If a desired level of performance is not achieved, then call quality may suffer to the point of dropping the call. When a call is established and while the call is up, there are a number of performance metrics (characteristics) that can be measured. Associated with each metric may be one or more specifications that define a performance level to be achieved. Examples of metrics include those listed above including BER, FER, alignment, and the like, as well as carrier sense, signal strength, alignment drift and absolute alignment.

When making grouping decisions (i.e., to decide which calls to combine in a spatial channel), some or all of these metrics may be evaluated to determine a best grouping as described above. However, the evaluation of groupings can be affected by changes made while processing the calls. Changes can arise due to performance issues, that is, the grouping can be deemed to be better or worse than initially thought due to changes in the performance of one or more of the terminal devices (e.g., handsets), the basestation or interferers.

In one implementation, after groupings are determined and stored in the spatial matrix, one or more performance enhancing activities can be invoked. The performance enhancing activities can include activities to make groupings that are identified as desirable, more desirable. That is, once a grouping (a "best" grouping) is identified as being one that may be required to be made (in the event a new call is received or a channel needs to be made available), one or more performance enhancing activities can be invoked to make the potential grouping even more desirable. For example, one or more metrics can be evaluated and changes (e.g., in alignment, frequency etc.) can be made for one or more of the calls in the grouping. For example, the grouping may be a "best" grouping of those available, however, the grouping may itself still be sub-optimal. Changes in the call specifications for members of the grouping may result in a better performing group (in the event that the calls are so grouped).

Alternatively, changes can be made to calls that are not included in the "best" grouping to enhance the success of a grouping should it arise. For example, calls not in the grouping can be shifted in frequency or alignment, resulting in a better performing best grouping.

The performance enhancing activities may be required to be performed at certain times. For example, some changes may be required to be performed at the time of a slot switch (i.e., a TCH switch), while other changes may be invoked immediately. Examples of performance enhancing activities are discussed in greater detail below. While alignment and frequency shifts are discussed as possible performance enhancing activities, other changes may be invoked as is known in the art.

Performance Enhancing Activities

As discussed above, the transition to spatial channels can be risky. Characteristics of the calls (i.e., links) in a grouping can be changed beforehand to minimize those risks. Furthermore, spatial channels might not function without certain link conditions and to attempt spatial channels, these characteristics must be established ahead of time.

Alignment

Spatial processing algorithms may be sensitive to alignment among callers sharing a spatial channel. For some spatial processing algorithms, the terminal units (e.g., handsets) must be at different alignments to support spatial channels. In one implementation, the two terminal devices must have an alignment difference of at least 1 symbol for the spatial processing algorithms to successfully distinguish one terminal unit from another. Other algorithms are more efficient if the terminal devices are on the same alignment. Still other systems may perform better where each terminal device is shifted by some integer plus a half symbol. Accordingly, when a given grouping of calls (as identified in the spatial matrix) may be realized, proactive alignment changes may be invoked depending on the performance criteria of the given spatial processing algorithms used.

Figure 3:
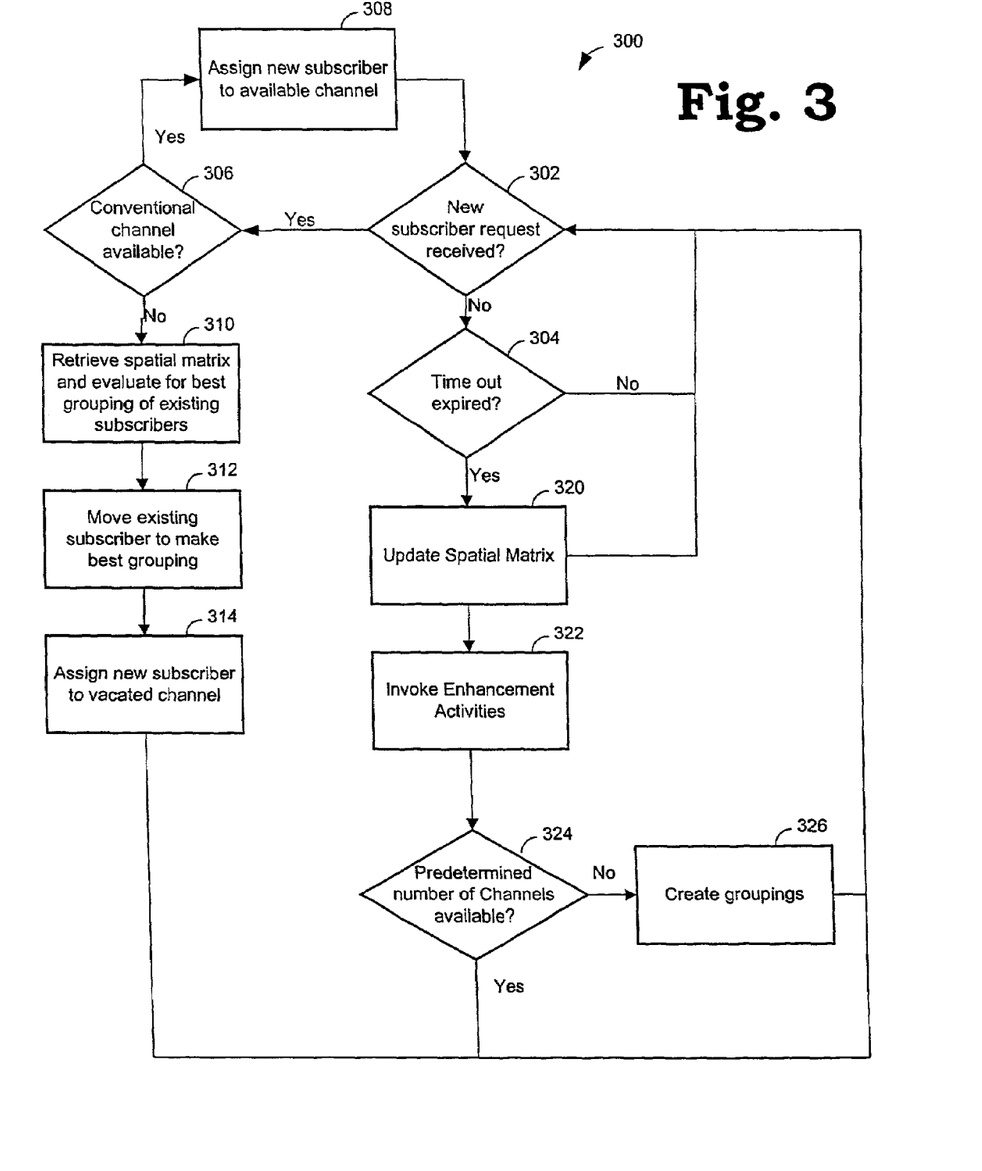
FIG. 3 is a flow diagram for a method for channel assignment including enhancing activities.

Referring now to FIG. 3, a method for assigning channels 300 is shown. The method can include spatial channels where two or more subscribers share a spatial channel. The method includes a check to determine if a request from a new subscriber has been received (302). If not, a check is made to determine if a timeout has expired, indicating that a grouping analysis should be invoked (304). If the timeout has not expired, then the process continues at step 302.

If a request from a new subscriber has been received at step 302, then a check is made to determine if any conventional channels are available (306). If one is available, then the new subscriber is assigned to an available channel (308) and the process continues at step 302. If there are no available conventional channels at step 306, then the spatial matrix is retrieved and evaluated to determine a best grouping for existing subscribers (310). In one implementation, the best grouping is determined to be the grouping corresponding to the entry in the matrix having a greatest value. When the best grouping is determined, one or more of the subscribers of the best grouping is ordered to change channel assignments to the channel associated with one other of the best grouping (312). Concurrently, the new subscriber is assigned to the vacated channel previously occupied by the transferred one of the subscribers of the best grouping (314). Thereafter the process continues at step 302.

If the timeout period in step 304 has expired (indicating that the time for grouping analysis and enhancement has arrived), then the spatial matrix is updated (320). The updating can include the evaluation of various characteristics of each subscriber (and link). Thereafter, the basestation can invoke one or more enhancement activities to better prepare the groupings for spatial channels (322). The enhancement activities can include the shifting of frequency or alignment or other activities that are designed to better prepare the subscribers in a grouping for sharing a spatial channel as discussed in greater detail below. After the enhancement activities, a check can be made to determine if a predetermined number of conventional channels are available in the system (324). In one implementation, no conventional channels are "reserved" for potential new subscribers. Alternatively, one or more conventional channels may be reserved. If the predetermined number of conventional channels is available, then the process continues at step 302. If an insufficient number of conventional channels is available, then groupings of subscribers are performed (including moving callers to appropriate spatial channels) using the spatial matrix until the predetermined number of conventional channels is available (326). The groupings may require the shifting of subscribers from one conventional channel or from a spatial channel to another. Thereafter the process continues at step 302.

The enhancement activities described above with respect to step 322 may include alignment shifts in anticipation of grouping subscribers in spatial channels. As a practical matter, the uplink spatial algorithms on the basestation might not be able to keep up with the way in which alignment changes. For example, when a terminal unit TCH switches and changes alignment, the alignment of the terminal unit initially might have too much jitter to allow spatial algorithms to track the terminal unit. In one implementation, the alignment of the terminal unit is shifted prior to the TCH switch so that when the terminal unit TCH switches into a spatial channel, its alignment will be more stable and the spatial algorithm will be able to track well all of the grouped calls sharing the spatial channel.

The terminal units themselves might not be able to track dramatic changes in alignment. In one implementation, the spatial processing system requires one symbol difference between the terminal units to initiate spatial channels. If the system tries to abruptly shift the terminal unit the entire one symbol as the system is attempting to establish spatial channels, the terminal unit might drop the call because of an out-of-specification alignment shift. Accordingly, in one implementation, alignment shifts, where necessary, may be shifted in gradual increments to avoid the out-of-specification difficulties.

In one implementation, the alignment of all calls on the basestation is attempted to be shifted in a way such that any call could be paired with any other call in a spatial channel. The more calls processed, the more difficult this task is to realize. The basestation may also be limited by the absolute extent which alignments can be shifted (e.g., when the absolute alignment shift limits for the system are within the range −1 symbol to +1 symbol, it is impossible to shift four phones simultaneously so that they all are shifted at least 1 symbol from each other) or by the logistics by which the system shifts alignment (e.g., if the basestation shifts solely through use of TCH switches, it would be impossible to change alignment when all slots are full).

In one implementation, terminal units are prepared for spatial channels as part of the enhancement activities of step 322. Each subscriber is continual monitored. In systems where shifting is accomplished using TCH switches, at least one conventional channel must be available to support enhancement activities (that way TCH switches can be used to shift alignment). Information from the spatial matrix is evaluated to determine a best pairing (grouping). A check is made to determine the alignment of each of the subscribers to the grouping. If the pairing (grouping of calls with the best characteristics for spatial channels) doesn't have the correct differential alignment, one of the two terminal units associated with the subscribers is forced to TCH switch including a forced change of alignment. Accordingly, when the time for filling the vacant slot arrives, the best candidates for spatial channels are ready to be grouped.

In another implementation, the best pairing may itself be a poor choice for spatial channels. If the best available grouping is insufficient to support spatial channels, then one or more groupings of calls that are unsuitable for spatial processing may be identified. Members of the group may be forced to change alignment in the hopes that a new caller can be paired with one of the group and achieve an adequately performing spatial channel group. The system orders the terminal units associated with an "unsuitable" group are forced to TCH switch to the same (or different, depending on the algorithms supported) alignment. When a new call is received, the new call is forced to a different (the same) alignment than the members of the group. In this way, the new call will have a greater chance of pairing with one call within the group.

In a system where call alignment can be drifted, then alignment changes can be forced as discussed above to enhance future groupings. In these systems, enhancement activities can be invoked without requiring a free conventional channel. Calls are continually monitored and one or more groupings of calls can be slowly drifted to alignments suitable for spatial channels. When a new call is received, the groupings will be better suited for spatial channels.

Frequency

In a conventional system, shifting terminal units must pass a carrier sense determination on a destination slot. During the period for testing by the shifting terminal unit, the two or more terminal units that are to occupy the slot to create a spatial channel have requirements that are at odds. The shifting terminal unit performs a carrier sense determination by measuring background radiation on the destination slot, which must fall below a certain level if the switch is to be successful. At the same time, if the signal to the existing terminal units that occupy the slot drops to low for too long, the per rate will exceed one or more of the terminal unit's thresholds, causing the unit to request a TCH switch or a handover (i.e., causing a spatial channel to fail).

In one implementation, the shifting terminal unit can be enabled to pass carrier sense by stopping transmission on the slot all together for a short period of time. Whether this succeeds or not depends on the length of time and the specifications of the particular model of the terminal units using the slot. However, the original terminal units might not allow for loss of signal for the length of time needed for the shifting terminal unit.

In another implementation, a method to pass carrier sense includes the use of the spatial signature from the slot vacated by the shifting terminal unit. The system can force the transmit weights one or more terminal units (i.e., terminal units that are associated with a channel that is too be shared) to be orthogonal to the spatial signature of a shifting terminal unit (i.e., the terminal unit that is to be shifted to the shared channel). This solution should reduce the amount of power delivered to the shifting terminal unit enough that the basestation would only need to reduce overall power transmitted rather than eliminate it entirely (as proposed above). The shifting technique proposed is better suited to allow the system to stay within the specifications of a broader range of terminal units.

Mathematically the weight being used to transmit to the initial terminal user (the user transmitting originally on the channel that is to be shared) is defined as $w_i$ and the spatial signature of the shifting user as $S_s$. Then, the new weight used to transmit can be expressed as $$Wn = Wi = Ss \frac{\langle Wi, Ss \rangle}{\|Sx\|^2}$$

where is the standard complex dot product.

However, the spatial signatures and transmission weights differ at different frequencies. Spatial signatures and weights also change over time. Accordingly the origin slot and the destination slot must be of the same frequency or very close to the same frequency just before the system attempts to establish spatial channels.

In one implementation, the system forces all calls to be on the same frequency. However, this solution may not be desirable because call quality may be affected due to interference on one of the slots at the common frequency.

Alternatively, only certain ones of the calls are kept at the same frequency. In one implementation, terminal units are prepared for spatial channels as part of the enhancement activities described above. If a pair (grouping) of calls with the best characteristics for spatial channels doesn't have the correct frequency, one of the two (or more) terminal units is forced to TCH switch including a forced change of frequency. Accordingly, when the vacant slot fills, the best candidates for spatial channels share the same frequency and are ready to be grouped.

The present invention has been described in terms of specific embodiments. The invention however, is not limited to these specific embodiments. Rather, the scope of the invention is defined by the following claims and other embodiments are within the scope of the claims.

For example, the present invention has been described in terms of a specific wireless cellular communication system. Those of ordinary skill in the art will readily recognize the application of these principles to other similar communication systems, such as wireless local area networks.

The system has been described in terms of pairings of calls and a matrix of recommendations for pairings. A single channel may support more than two calls (N-calls) and as such a N-dimensional construct may be used for storing recommendation data for combinations of callers for a given channel (e.g., 3 callers sharing a channel and a three dimensional structure for storing information about combinations of triples (of callers)). In addition, the methods disclosed herein are applicable to systems where spatial channels are used to support three or more callers and where callers are shifted to create larger groupings of callers depending on demand (e.g., grouping three callers when all channels support two callers and a new channel is required to be freed).

The system has been described in terms of a pairing of existing subscribers and the assignment of a new subscriber to a free conventional channel. In one implementation, if no acceptable pairing of existing subscribers can be made, then a best pairing of the new subscriber and an existing subscriber can be made. If no acceptable pairing can be located, then the new subscriber may not be serviced. In one implementation, the new subscriber is evaluated along with other subscribers to determine optimal pairings, however, the new subscribers factors may be weighted based on the amount of data collected (e.g., the time of call duration).

The system has been described in terms of a pairing of existing subscribers and the assignment of a new subscriber to a free conventional channel. In one implementation, the system includes plural subscribers on each of one or more spatial channels. In one implementation, the system does not free up a conventional channel for the new subscriber. Alternatively, the system creates groupings of subscribers to create at least one "less populated" channel and a new subscriber is combined with any existing subscribers on the less populated channel. For example, if four spatial channels are available, each supporting two subscribers, the system would create the following groupings to support a new subscriber: one combination of three subscribers from all the existing subscribers, two combinations of two subscribers, and one less populated channel with but a single subscriber. When a new subscriber request is received, the new subscriber is assigned to the less populated channel. In this implementation, the system determines a loading threshold for each channel including a maximum number of subscribers that can be assigned to a given channel. Assuming that the network loading threshold is not exceeded, the system creates groupings that allow for new subscribers to be added while minimizing the performance hit from the added subscriber. If the network loading threshold will be exceeded, the new subscriber is not supported (i.e., dropped).

Other variations will become evident from the descriptions provided without departing from the spirit and scope of the invention which should only be limited as set forth in the claims that follow.

What is claimed is:

1. A method for assigning channels in a spatial division multiple access communication network, the network including a plurality of conventional channels some of which are configurable to be shared concurrently by plural subscribers as spatial channels, the method comprising:
   a. determining if a new subscriber is to be added to the network;
   b. determining if a conventional channel is available, and if so, assigning the new subscriber to the available conventional channel;

c. if no conventional channel is available, determining an acceptable combination of subscribers from the existing subscribers and not including the new subscriber to share a channel as spatial channels;

d. reassigning the existing subscribers to share the channel creating a spatial channel thereby freeing at least one conventional channel; and e. assigning the new subscriber to the free conventional channel.

2. The method of claim 1 further comprising:

periodically evaluating each spatial channel including:

determining if each combination is an acceptable combination, and if not, then reassigning the existing subscribers to achieve acceptable combinations.

3. The method of claim 2 wherein the step of determining if each combination is acceptable includes evaluating with hysteresis each combination such that the step of reassigning the existing subscribers only is executed when a new combination is substantially better than an existing combination.

4. The method of claim 2 wherein the step of determining if each combination is acceptable includes evaluating with hysteresis each combination such that the step of reassigning the existing subscribers only is executed when a new combination is recommended, and wherein a new combination is recommended only where the new combination is a predetermined amount better than an existing combination.

5. The method of claim 1 wherein the step of determining an acceptable combination includes
   a. retrieving a n-dimensional structure of recommendations, each entry in the n-dimensional structure including a rating for a combination of n existing subscribers, and
   b. evaluating each n-dimensional structure entry and selecting a combination that is optimal.

6. The method of claim 1 wherein the step of determining an acceptable combination includes
   a. retrieving a matrix of recommendations, each entry in the matrix including a rating for a pairing of existing subscribers, and
   b. evaluating each matrix entry and selecting a pairing that is optimal.

7. The method of claim 1 further comprising
   a. evaluating combinations of subscribers periodically and rating each combination for compatibility based on one or more factors;
   b. storing the rating for each pair in a n-dimensional structure of ratings; and
   c. wherein the step of determining an acceptable combination includes evaluating the n-dimensional structure of ratings to identify an optimal combination of n existing subscribers.

8. The method of claim 7 wherein the step of providing a n-dimensional structure includes calculating for each combination a rating as a function of one or more predetermined factors.

9. The method of claim 8 wherein the factors are selected from the group consisting of subscriber speed, dynamic range, correlation, received signal strength indicator, frame error rate, alignment and monitored time.

10. The method of claim 8 wherein the rating is a value that indicates whether a combination is acceptable or unacceptable.

11. The method of claim 10 wherein an acceptable rating is further subdivided into a plurality of gradations, each corresponding to a combination of factors that is less than desirable, but still acceptable for combining the respective subscribers, where a number of gradations is a predetermined number.

12. The method of claim 8 wherein the rating is a value that indicates whether a pairing is desirable, acceptable or unacceptable.

13. The method of claim 8 wherein the rating is a value, and the value can be selected from n-possible values ranging from acceptable to unacceptable.

14. The method of claim 8 wherein each factor has a desirable threshold, and wherein a combination is assigned a desirable rating if a measured value for a factor associated with either the combination or an individual subscriber of the combination for any of the factors exceeds a desirable threshold.

15. The method of claim 8 wherein each factor has a desirable threshold, and wherein a combination is assigned a desirable rating if a measured value for a factor associated with either the combination or an individual subscriber of the combination for all of the factors exceeds a desirable threshold.

16. The method of claim 8 wherein each factor has a desirable threshold, and wherein a combination is assigned a desirable rating if a measured value for a factor associated with either the combination or an individual subscriber of the combination for a predetermined number of the factors exceeds a desirable threshold.

17. The method of claim 8 wherein each factor has a minimal threshold, and wherein a combination is assigned an unacceptable rating if a measured value for a factor associated with either the combination or an individual subscriber of the combination for at least one of the factors is less than a minimal threshold.

18. The method of claim 8 wherein each factor has a minimal threshold, and wherein a combination is assigned an unacceptable rating if a measured value for a factor associated with either the combination or an individual subscriber of the combination for all of the factors are less than a minimal threshold.

19. The method of claim 8 wherein each factor has a minimal threshold, and wherein a combination is assigned an unacceptable rating if a measured value for a factor associated with either the combination or an individual subscriber of the combination for a predetermined number of factors are less than a minimal threshold.

20. The method of claim 8 wherein each factor has an acceptable threshold, and wherein a combination is assigned an acceptable rating if a measured value for a factor associated with either the combination or an individual subscriber of the combination for any of the factors exceeds an acceptable threshold.

21. The method of claim 8 wherein each factor has an acceptable threshold, and wherein a combination is assigned an acceptable rating if a measured value for a factor associated with either the combination or an individual subscriber of the combination for all of the factors exceeds an acceptable threshold.

22. The method of claim 8 wherein each factor has an acceptable threshold, and wherein a combination is assigned an acceptable rating if a measured value for a factor associated with either the combination or an individual subscriber of the combination for a predetermined number of the factors exceeds an acceptable threshold.

23. The method of claim 8 wherein a factor is an amount of time that a subscriber has been monitored, and wherein a combination is assigned an unacceptable rating if an amount of time that any individual subscriber of the combination has been monitored is less than a minimal time threshold.

24. The method of claim 23 wherein the minimal time threshold is approximately two seconds.

25. The method of claim 8 wherein each of the predetermined factors is weighted, and the rating is a function of the one or more weighted predetermined factors.

26. The method of claim 1 wherein the step of determining an acceptable combination of subscribers from the existing subscribers includes
   a. determining if no combination of existing subscribers is acceptable;
   b. if no combination of existing subscribers is acceptable then determining if a combination of one or more existing subscribers and the new subscriber is acceptable; and
   c. if so, combining the new subscriber with one or more existing subscribers to make a best combination.

27. The method of claim 26 wherein the step of combining the new subscriber with one or more existing subscribers includes not making a combination if a rating associated with the combination is less than a preset threshold and dropping the new subscriber.

28. A method for assigning channels in a spatial division multiple access communication network, the network including a plurality of conventional channels some of which are configurable to be shared concurrently by plural subscribers as spatial channels, the method comprising:
   a determining if a new subscriber is to be added to the network;
   b. determining if a predetermined number of conventional channels are available, and if so, assigning the new subscriber to one of the available conventional channels;
   c. if the predetermined number of conventional channels are not available, determining one or more acceptable combinations of subscribers from the existing subscribers and not including the new subscriber to share a channel as spatial channels;
   d. reassigning the existing subscribers in each combination to share a channel creating one or more spatial channels thereby freeing at least one conventional channel; and
   e. assigning the new subscriber to the free conventional channel.

29. A method for assigning channels in a spatial division multiple access communication network, the network including a plurality of conventional channels some of which are configurable to be shared concurrently by plural subscribers as spatial channels the method comprising:
   a. determining if a predetermined number of conventional channels are available;
   b. if the predetermined number of conventional channels are not available, determining one or more acceptable combinations of subscribers from the existing subscribers;
   c. reassigning the existing subscribers in each combination to share a channel creating one or more spatial channels thereby freeing at least one conventional channel for a future subscriber.

30. The method of claim 29 where the predetermined number is one.

31. A method for assigning channels in a spatial division multiple access communication network, the network including a plurality of conventional channels some of which are configurable to be shared concurrently by plural subscribers as spatial channels, the method comprising:
   a. determining a network loading threshold for conventional channels including determining a number of channels to be shared concurrently by plural subscribers as spatial channels and the number of subscribers to share each channel;
   b. determining one or more acceptable combinations of subscribers from the existing subscribers without violating the network loading threshold including reducing a number of subscribers assigned to at least one channel; and
   c. reassigning the existing subscribers as necessary to form the acceptable combinations creating one or more spatial channels and thereby freeing space on the one conventional channel for a future subscriber.

32. The method of claim 31 further including
   a. receiving a request to add a new subscriber;
   b. determining if the network loading threshold would be exceeded by adding the new subscriber; and
   c. if not, adding the new subscriber to the one channel.

* * * * *